US011430623B2

(12) United States Patent
Vladuchick et al.

(10) Patent No.: US 11,430,623 B2
(45) Date of Patent: Aug. 30, 2022

(54) CIRCUIT BREAKER ENCLOSURE HAVING INTEGRATED PASS-THROUGH

(71) Applicant: Hitachi Energy Switzerland AG, Baden (CH)

(72) Inventors: Paul Jason Vladuchick, Cranberry Township, PA (US); Mauricio Aristizabal, Pittsburgh, PA (US); Matthew D. Cuppett, Uniontown, PA (US)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/418,890

(22) PCT Filed: Dec. 18, 2019

(86) PCT No.: PCT/US2019/067198
§ 371 (c)(1),
(2) Date: Jun. 28, 2021

(87) PCT Pub. No.: WO2020/142216
PCT Pub. Date: Jul. 9, 2020

(65) Prior Publication Data
US 2022/0044893 A1    Feb. 10, 2022

Related U.S. Application Data

(60) Provisional application No. 62/786,695, filed on Dec. 31, 2018.

(51) Int. Cl.
*H01H 9/52*    (2006.01)
*H01H 33/56*    (2006.01)
(Continued)

(52) U.S. Cl.
CPC .............. *H01H 33/56* (2013.01); *H01H 9/52* (2013.01); *H01H 33/7015* (2013.01); *H02B 13/045* (2013.01)

(58) Field of Classification Search
CPC .......... H01H 9/52; H01H 33/56; H01H 33/53; H01H 33/55; H01H 33/7015;
(Continued)

(56) References Cited

U.S. PATENT DOCUMENTS

| 4,006,332 A | 2/1977 | Crookston et al. |
| 4,208,556 A | 6/1980 | Patel et al. |

(Continued)

FOREIGN PATENT DOCUMENTS

| CN | 107818885 A | 3/2018 |
| JP | H0311027 A | 5/1991 |

OTHER PUBLICATIONS

International Search Report and Written Opinion of the International Searching Authority, PCT/US2019/067198, dated Feb. 24, 2020, 9 pages.

(Continued)

*Primary Examiner* — William A Bolton
(74) *Attorney, Agent, or Firm* — Sage Patent Group

(57) ABSTRACT

An enclosure of a circuit breaker that includes an interior region and a pass-through. The interior region can be sized to house a circuit interrupter and a dielectric insulating medium. The pass-through can include a pathway having a first open end and a second open end, the first and second open ends being in direct fluid communication with each other through the pathway. The first and second open ends can be secured to the enclosure such that the pass-through is integral to the enclosure, such as, for example, being part of a monolithic structure or constructed to form a unitary body. Additionally, the pathway may not be in direct fluid com- (Continued)

munication with the interior region of the enclosure. Further, the pass-through can be offset from, or extend directly into, the interior region of the enclosure.

20 Claims, 8 Drawing Sheets

(51) Int. Cl.
*H01H 33/70* (2006.01)
*H02B 13/045* (2006.01)

(58) Field of Classification Search
CPC .... H01H 33/7053; H01H 33/75; H01H 33/76; H01H 33/91; H02B 13/045; H02B 13/055; H02B 13/02

USPC .... 218/1, 97, 112, 12, 13, 37, 57, 85, 4, 71; 219/201
See application file for complete search history.

(56) References Cited

U.S. PATENT DOCUMENTS

| | | | |
|---|---|---|---|
| 4,434,335 A | 2/1984 | Natsui et al. | |
| 6,307,172 B1* | 10/2001 | Bolin | H01H 33/56 174/16.2 |
| 7,102,101 B1 | 9/2006 | Johnson et al. | |
| 7,816,603 B2* | 10/2010 | Nowakowski | H02B 13/045 174/50 |
| 9,799,472 B1* | 10/2017 | Hermosillo | H02G 5/065 |
| 9,991,064 B2* | 6/2018 | Vladuchick | H02B 13/0655 |
| 10,121,619 B2 | 11/2018 | Maduchick et al. | |
| 2006/0120024 A1 | 6/2006 | Chartouni et al. | |
| 2013/0221292 A1 | 8/2013 | Ingold et al. | |
| 2014/0083737 A1 | 3/2014 | Piccoz et al. | |
| 2018/0075990 A1 | 3/2018 | Maduchick et al. | |

OTHER PUBLICATIONS

Chinese First Office Action dated Oct. 26, 2021 for Chinese Patent Application No. 201980087283.9, 12 pages (including English translation).

* cited by examiner

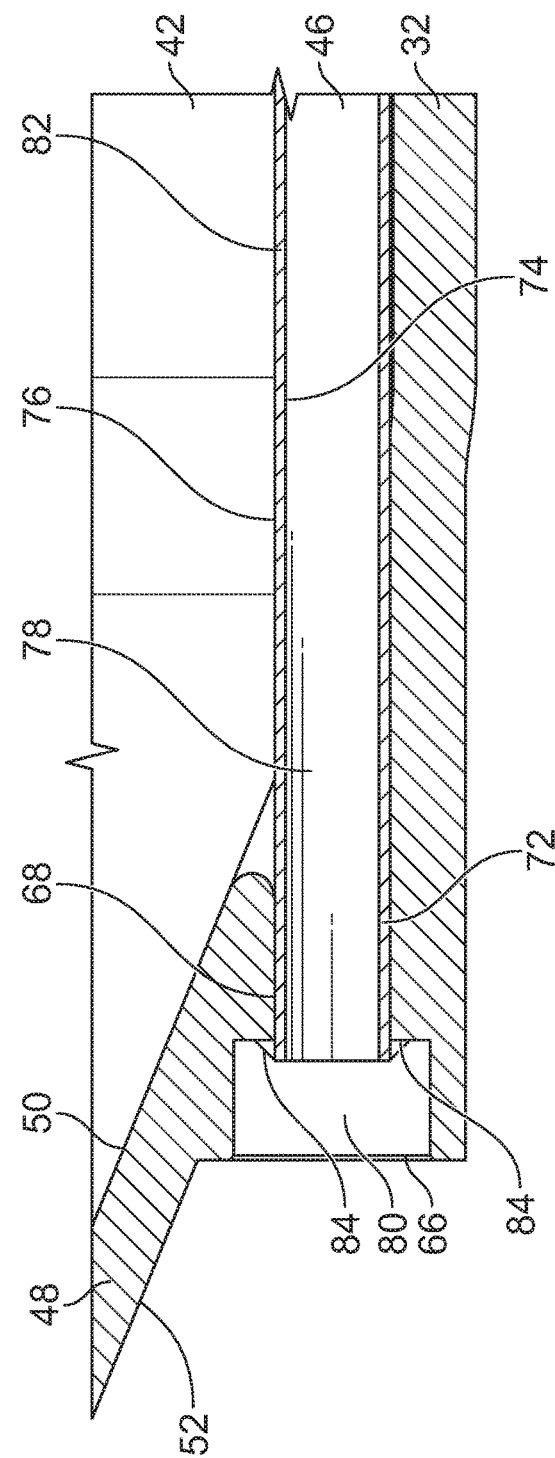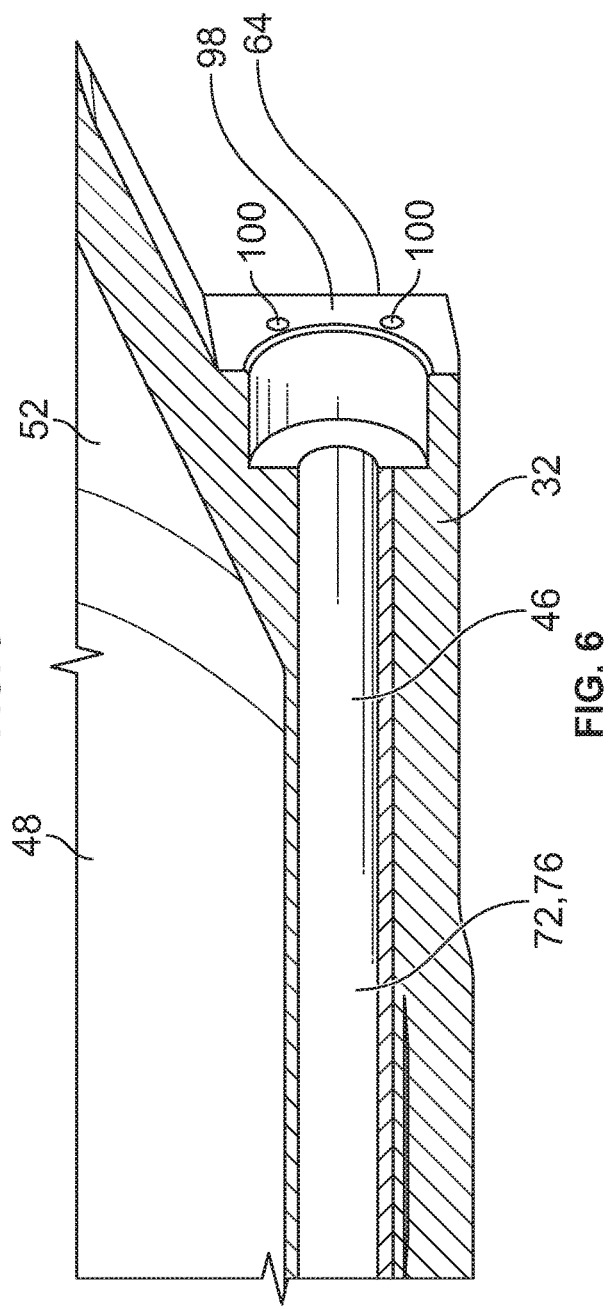

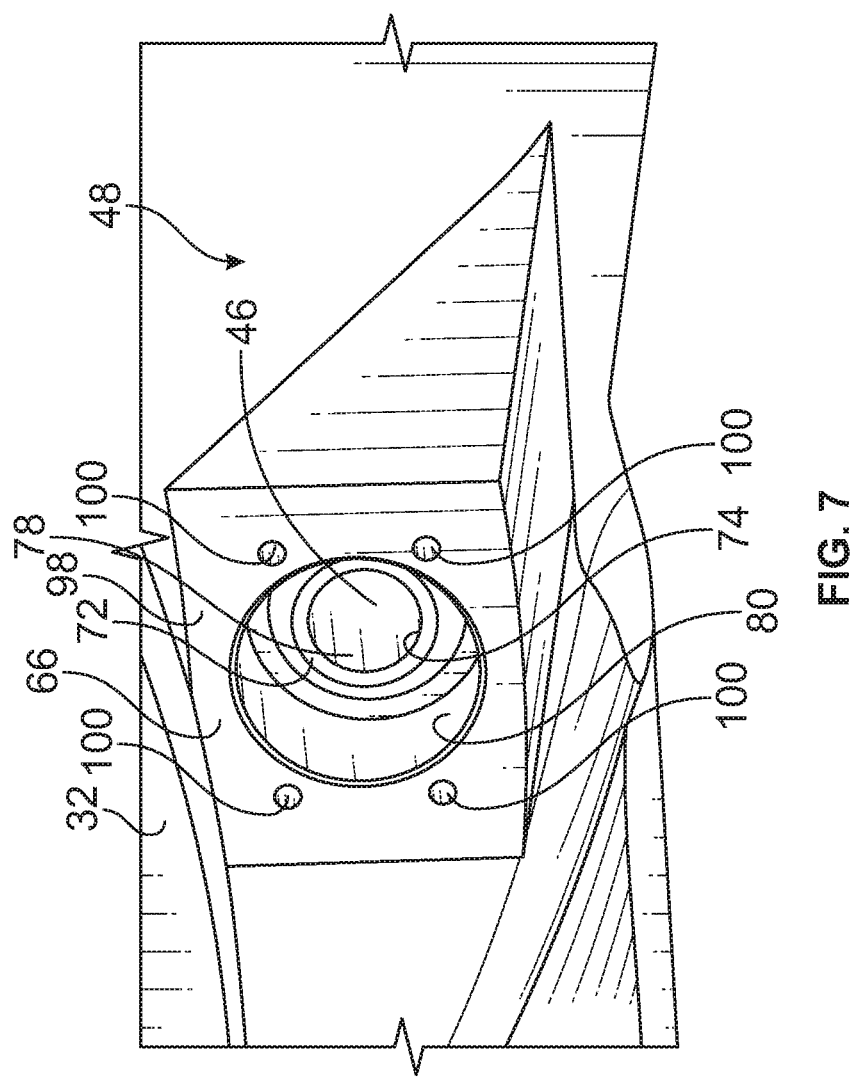

CIRCUIT BREAKER ENCLOSURE HAVING INTEGRATED PASS-THROUGH

CROSS REFERENCE TO RELATED APPLICATIONS

This application is a 35 U.S.C. § 371 national stage application of PCT International Application No. PCT/US2019/067198 filed on Dec. 18, 2019, which in turns claims domestic priority to U.S. Provisional Patent Application No. 62/786,695, filed on Dec. 31, 2018, the disclosures and content of which are incorporated by reference herein in their entirety.

BACKGROUND

Embodiments of the present application generally relate to electrically conductive enclosures for circuit breakers. More particularly, but not exclusively, embodiments of the present application relate to an integrated pass-through feature for enclosures that house a dielectric insulating medium for a circuit breaker.

Various types of circuit breakers used to selectively open and close electrical connections utilize a sealed enclosure or tank that is filled with a liquid or gaseous dielectric insulating medium. For example, certain types of circuit breakers can employee one or more circuit interrupters that are housed within a sealed enclosure, including, for example, a dead tank or a live tank. The dielectric insulating medium within the sealed enclosure can be used in at least an attempt to reduce and/or quench arcing, as well as prevent the flow of electrical current from electrically active parts and at least the enclosure that can be associated with the operation of the contact of a circuit breaker. Moreover, such arcing can be associated with the displacement within a circuit breaker of a moveable contact relative to a stationary contact of a circuit interrupter.

For at least certain types of insulating mediums, the ability of the insulating medium to effectively function can require that the insulating medium be maintained at, or around, certain temperatures. For example, at least certain types of gaseous insulating fluids can experience liquefaction if the temperature of the gaseous insulating fluid drops below a certain temperature(s), which can diminish of the effective density of the remaining insulating fluid that may remain in the gaseous physical state. Alternatively, events or conditions, including, for example, surrounding environment or operational factors, may be necessitate the cooling of the insulating medium. Attempts to address such issues have included attaching, such as, for example, bolting, a heating element and/or its associated encasing directly to one end of an enclosure such that the heating element is suspended into the enclosure. However, such connections, which can include additional labor and expense, create a potential area for a breach in the sealing capacities of the enclosure. Further, with respect to at least heating elements, over time, such a suspended configuration can result in the heating element deforming to a curved or bent profile, which can adversely affect the effectiveness of the heating element and/or damage the heating element, thereby necessitating burdensome maintenance at least in terms of retrieving the heating element.

BRIEF SUMMARY

An aspect of the present application is an enclosure for a circuit breaker, the enclosure having a first end and a second end, the first end and the second end being at opposing ends of the enclosure. The enclosure can further include a wall that defines at least a portion of an interior region of the enclosure, the interior region being sized to house a dielectric insulating medium and a circuit interrupter. The enclosure can further include a pass-through that extends through at least a portion of the wall of the enclosure. The pass-through can have a pathway that includes a first open end and a second open end, the first open end being adjacent to the first end of the enclosure, the second open end being adjacent to the second end of the enclosure. Additionally, the first and second open ends can be in fluid communication with each other across the pathway, and the pathway is not in direct fluid communication with the interior region of the enclosure.

Another aspect of the present application is an apparatus comprising an enclosure that extends between a first end and a second end along a first central longitudinal axis, the enclosure having an interior region and a pair of openings, each of the pair of openings sized to receive an electrical conductor of a pole assembly. The apparatus can also include at least one end cap that is coupled to at least one of the first end or the second end of the enclosure. The enclosure can further include a pass-through having a pathway, the pathway having a first open end and a second open end. The first and second open ends are in direct fluid communication through the pathway, and can be secured to the enclosure such that the pass-through is integral to the enclosure. Additionally, the pathway is not in direct fluid communication with the interior region of the enclosure.

Additionally, an aspect of the present application is a circuit breaker comprising at least one pole assembly having a first electrical conductor, a second electrical conductor, an enclosure, and a circuit interrupter. The enclosure can include an interior region and a pass-through, the interior region being sized to house the circuit interrupter and a dielectric insulating medium. The pass-through can have a pathway having a first open end and a second open end, the first and second open ends being in direct fluid communication through the pathway. Additionally, the first and second open ends can be secured to the enclosure such that the pass-through is integral to the enclosure. Further, the pathway is not in direct fluid communication with the interior region.

BRIEF DESCRIPTION OF THE DRAWINGS

The description herein makes reference to the accompanying figures wherein like reference numerals refer to like parts throughout the several views.

FIG. 5 illustrates a cross sectional view of a first open end of an integral pass-through that defines a portion of an interior area of an enclosure according to an illustrated embodiment of the subject application.

FIG. 6 illustrates a perspective view of a second end of integral pass-through that is offset from an interior area of an enclosure according to an illustrated embodiment of the subject application.

FIG. 7 illustrates a perspective view of an open end of an integral pass-through of an enclosure according to an illustrated embodiment of the subject application.

FIG. 11 illustrates a cross sectional view of an integral pass-through portion of an enclosure according to an illustrated embodiment of the subject application in which opposing open ends of the pass-through are covered by end caps, and in which a sensor and a temperature control element are positioned in, and a cable is routed through, the integral pass-through.

Figure 1:
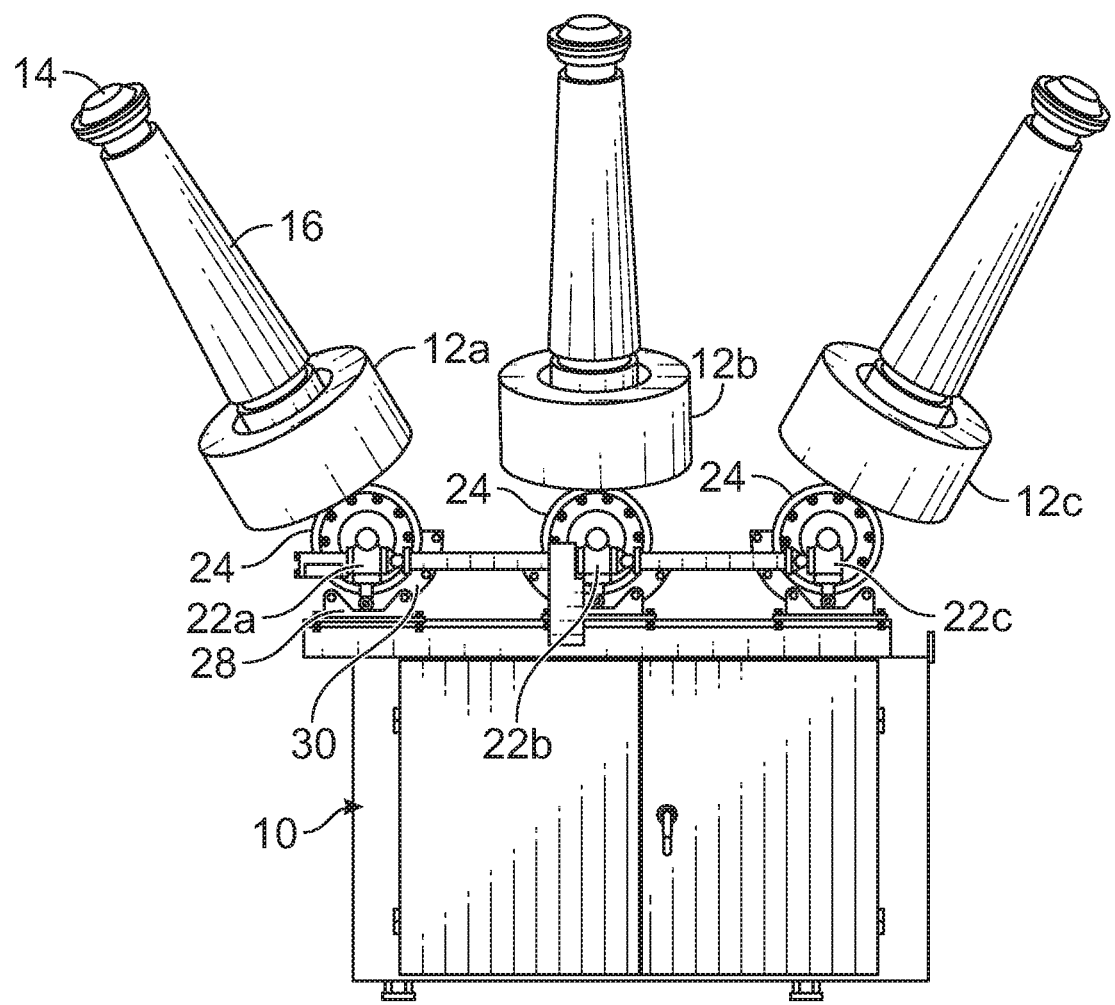
FIG. 1 illustrates a front view of a conventional high voltage dead tank circuit breaker.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 2:
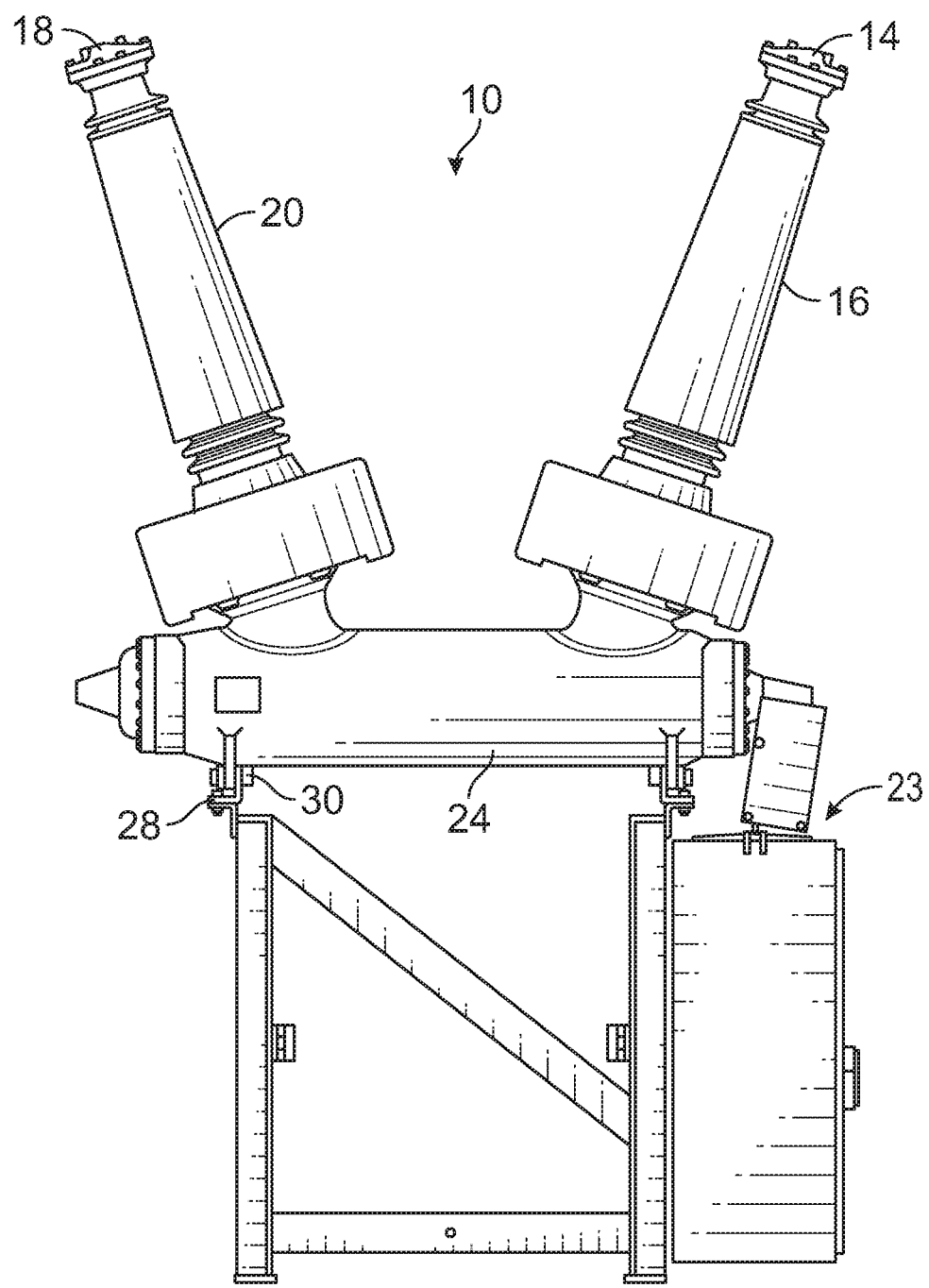
FIG. 2 illustrates a side view of the conventional circuit breaker of FIG. 1.

For purposes of illustration, FIGS. 1 and 2 depict a conventional dead tank circuit breaker, generally indicated at 10. According to the illustrated example, the circuit breaker 10 is a three-phase circuit breaker, and thus includes three p ole assemblies 12a, 12b, 12c, including outer pole assemblies 12a, 12c and a central pole assembly 12b. Each pole assembly 12a, 12b, 12c includes a first electrical conductor 14 carried in a first bushing 16 and a second electrical conductor 18 carried in a second bushing 20. Electrical power lines are coupled to the first and second electrical conductors 14, 18, and the circuit breaker 10 selectively opens or closes the electrical connection therebetween. A bell crank 22a, 22b, 22c is associated with a respective pole assembly 12a, 12b, 12c, the bell cranks 22a, 22b, 22c being interconnected by a gang-style linkage structure that includes interconnecting shafts so that all three poles assemblies 12a, 12b, 12c are actuated at the same time by a single operating mechanism, generally indicated at 23. Each pole assembly 12a, 12b, 12c includes an enclosure 24, which in this example is a dead tank, that can house the electrical contacts of the breaker 10, including, for example, one or more circuit interrupters. As shown in the illustrated example, each enclosure 24 is fixed to a support structure 28 by conventional bolts 30.

Figure 3:
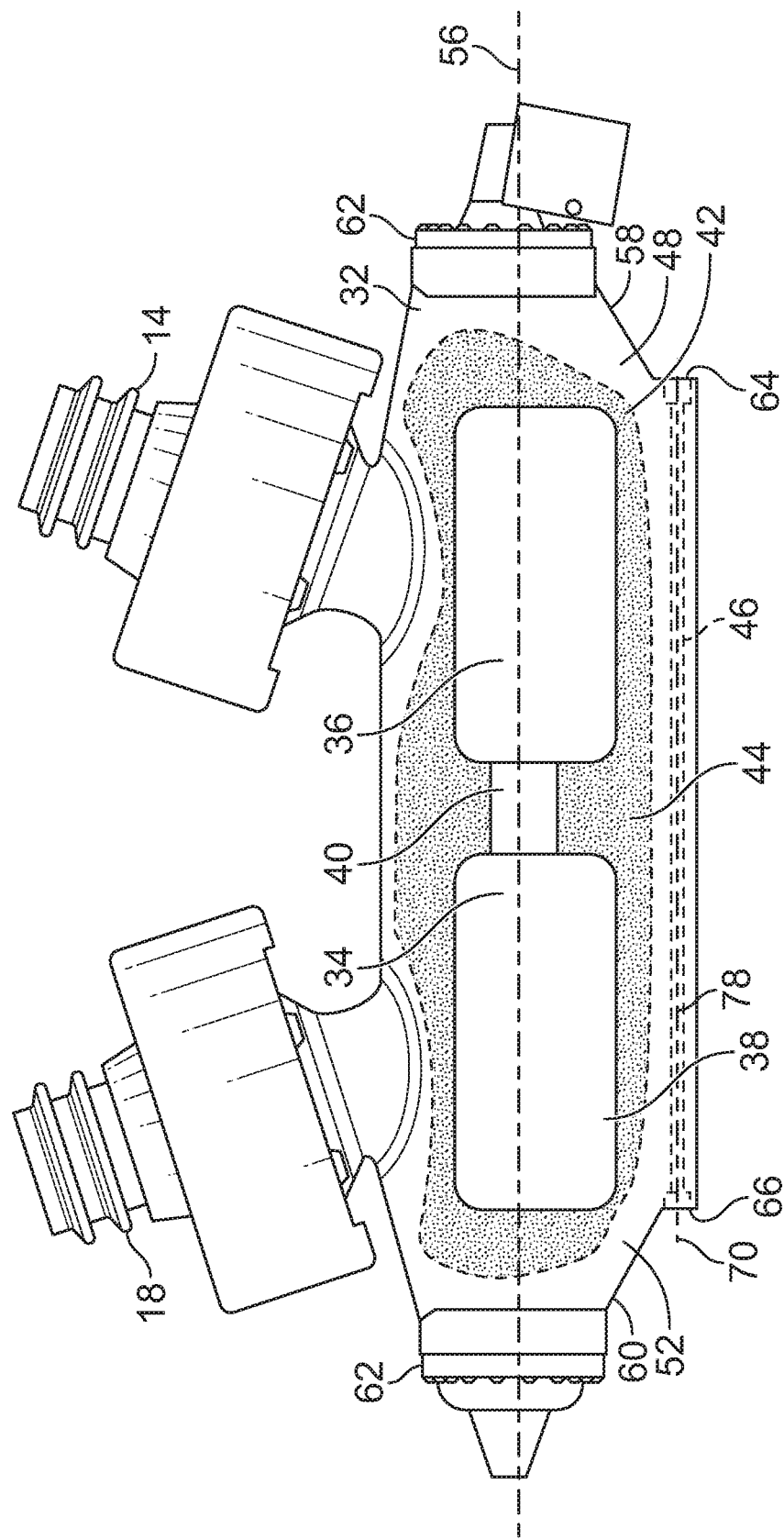
FIG. 3 illustrates a partial cutaway view of a portion of a sealed enclosure for a circuit breaker having a pass-through according to an illustrated embodiment of the subject application.
Figure 4:
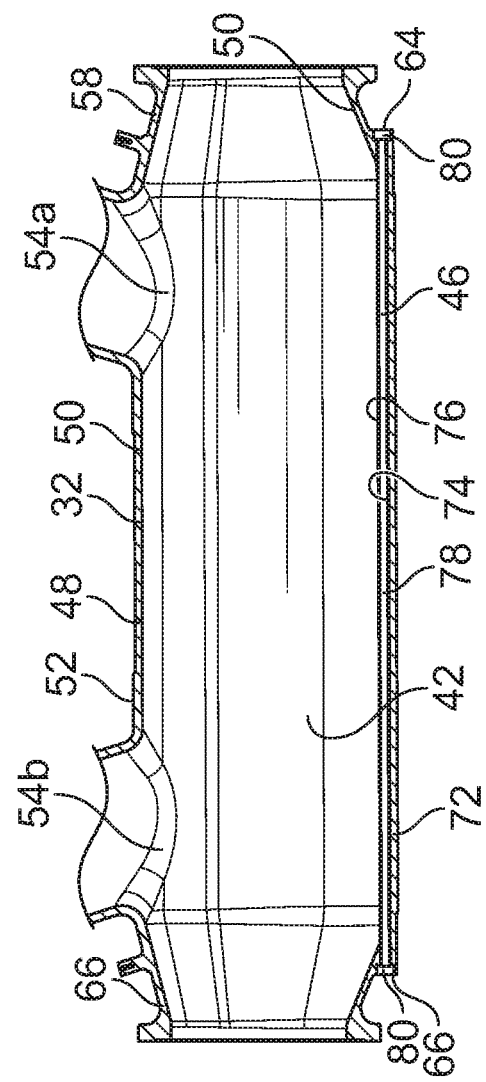
FIG. 4 illustrates a cross sectional view of a portion of an enclosure having a pass-through according to an illustrated embodiment of the subject application.

FIGS. 3 and 4 illustrate a partial cutaway view and a cross sectional view, respectively, of a portion of a sealed enclosure 32 for a circuit breaker 10 having a pass-through 46 according to an illustrated embodiment of the subject application. While FIGS. 1 and 2 illustrated an exemplary enclosure 24 in the form of a dead tank, the sealed enclosure 32 of the subject application can, in addition to being used as a dead tank, also be configured for use as an enclosure for a variety of other types of circuit breakers that utilize an insulating medium 44. For example, in addition to being used in connection with a dead tank circuit breaker, the enclosure 32 can also be used in connection with live tank circuit breakers, among other types of circuit breakers.

As shown, the enclosure 32 includes a wall 48 having an inner side 50 and an outer side 52. The inner side 50 can generally define at least a portion of an interior region 42 of the enclosure 32, and can be sized to house within the interior region 42 one or more circuit interrupters 34 and an insulating medium 44. Further, as shown, according to certain embodiments, a portion of the wall 48, such as, for example, an upper portion, can include a pair of openings 54a, 54b such that the interior region 42 of the enclosure 32 can be in fluid communication with, and/or house, at least a portion of the first and second electrical conductors 14, 18. Further, the enclosure 32 can linearly extend along a central longitudinal axis 56 (FIG. 3) between a first end 58 and an opposing second end 60 of the enclosure 32. The wall 48 at each end 58, 60 of the enclosure 32 can be configured to include an end opening that can be covered by an end cap 62, as shown for example in FIG. 3. Further, the wall 48 can be constructed from a variety of different materials, including, for example, aluminum and steel, as well as combinations thereof, among other materials. Additionally, according to certain embodiments, the enclosure 32, and more specifically the wall 48 of the enclosure 32, can be formed via casting, among other manners of fabrication or construction.

A variety of different types or styles of circuit interrupters 34 can be at least partially housed within the sealed enclosure 32. Often, a typical circuit interrupter 34 that can be housed within the interior region 42 of the enclosure 32 can include stationary and movable contact assemblies 36, 38, which may collectively provide the contact of the circuit breaker 10. Further, according to certain embodiments, the movable contact assembly 38 can be supported within the conductive enclosure 32 by the first electrical conductor 16. The movable contact assembly 38 can also be affixed to an insulator tube 40 that is also coupled to the stationary contact assembly 36, and through which a linearly operating rod (not shown) can extend. Moreover, the operating rod can operate one or more movable contacts of the moveable contact assembly 38, relative to one or more stationary contacts of the stationary contact assembly 36, between an electrically open position and an electrically closed position, and thus electrically open and/or close the contact of the circuit breaker 10. Additionally, the second electrical conductor 18 of the second bushing 20 can be connected to the stationary contact assembly 36 such that the stationary contact assembly 36 is also supported within conductive enclosure 32.

The sealed interior region 42 of the enclosure 32, as well as at least a portion of the entrance to the first and second bushings 16, 20, can be filled with the liquid or gaseous insulating medium 44. According to certain embodiments, the insulating medium 44 is a high pressure, electrically insulating gas, such as, for example, $SF_6$, among other insulating gases. Alternatively, the insulating medium 44 is ambient or compressed air. According to other embodiments, the insulating medium 44 can be a liquid, such as, for example, oil, among other liquid insulating mediums. For example, the insulating medium 44 can be utilized to quench arcing or corona discharge that can form as the one or more moveable contacts of the moveable contact assembly 38 is/are displaced between open and closed positions relative to the one or more stationary electrical contacts of the stationary contact assembly 36. Further, given the properties of the insulating medium 44, the insulating medium 44 can also act as an insulator between conductive parts within enclosure 32 and the wall(s) of enclosure 32, among other electrically conductive parts or components of the circuit breaker 10.

According to the illustrated embodiment, the pass-through 46 extends along a central longitudinal axis 70 between a first open end 64 and a second open end 66. The first and second ends 64, 66 can be positioned at, or generally adjacent to, the first and second ends 58, 60, respectively, of the enclosure 32. The central longitudinal axis 70 of the pass-through 46 may, or may not, be generally parallel to, and offset from, the central longitudinal axis 56 of the enclosure 32. According to the illustrated embodiment, the first and second open ends 64, 66 of the pass-through 46 are inwardly recessed from a portion of the first and second ends 58, 60 of the enclosure 32 such that the first and second open ends 64, 66 of the pass-through 46 are positioned generally beneath and/or adjacent to, a portion of the outer side 52 of the wall 48 of the enclosure 32. Alternatively, according to other embodiments, one or both of the first and second open ends 64, 66 can be generally linearly aligned with the associated first end 58 and/or second end 60 of the enclosure 32 such that the pass-through 46 generally extends the linear length of the enclosure 32.

The portion of the pass-through 46 containing at least the first and second open ends 64, 66 of the pass-through 46 are secured to, or otherwise part of, the wall 48 of the enclosure 32. Such configurations can secure the relatively rigid pass-through 46 to other portions of the enclosure 32, which can thereby restrain movement of the pass-through 46 at least in the inner region 42 of enclosure 32. Moreover, such a configuration can restrain the relatively ridged pass-through 46 so as to prevent at least the displacement of the pass-through 46 in a direction generally toward the electrical connections within the inner region 42 of the enclosure 32. Further, the first and second open ends 64, 66 of the pass-through 46 can each be configured to provide access to and/or through the pass-through 46 from either of the opposing first and second ends 64, 66 of the enclosure 32, as discussed below.

As shown in at least FIG. 4, according to certain embodiments, the pass-through 46 has a generally tubular configuration that comprises a passage wall 72 having an inner side 74 and an outer side 76. According to certain embodiments, the inner side 74 and/or outer side 76 of the passage wall 72 of the pass-through 46 can include, or be part of, a portion of the wall 48 of the enclosure 32, as discussed below. The inner side 74 of the passage wall 72 of the pass-through 46 can generally define a pathway 78 that includes, and extends between, the first and second open ends 64, 66 such the first and second open ends 64, 66 are in fluid communication with each other through the pathway 78. Additionally, according to certain embodiments, the pathway 78 can be configured such that the pathway 78 at either or both of the first and second open ends 64, 66 includes a counter bore 80.

In at least an attempt to maximize the thermal interaction between the pathway 78 of the pass-through 46 and at least the insulating medium 44, if not the wall 48 of the enclosure 32, the passage wall 72 can have a relatively thin thickness between the inner side 74 and the outer side 76 of the passage wall 72. For example, according to certain embodiments, the passage wall 72 can have a thickness of around 0.75 millimeters (mm) to around 4 millimeters (mm), and more specifically, a thickness of about 1 millimeter (mm). However, the thickness of the passage wall 72 can be based on a variety of different criteria, including, for example, anticipated pressures in the interior region 42 of the enclosure 32. The thickness of the passage wall 72 can also be influenced based on the ability of a heating element or heat exchanger that can be positioned within the pathway 78 to influence the temperature of insulating medium 44 within the enclosure 32, and/or the ability of a probe or sensor positioned within the pathway 78 to obtain relatively accurate measurements of the temperature of the insulating medium 44 that is within the enclosure 32. Further, according to certain embodiments, the thickness of the portion(s) of the passage wall 72 that is adjacent to the interior region 42 of the enclosure 32 can have a different thickness, such as, for example, be thinner, than the thickness of the portion(s) of the passage wall 72 that is not generally adjacent to the interior region 42, such as, for example, a portion(s) of the passage wall 72 that is adjacent, or extends, to the outer side 52 of the enclosure 32.

The inner and outer sides 74, 76 of the passage wall 72 of the pass-through 46 can have similar or dissimilar shapes and/or configurations. For example, according to certain embodiments, at least a portion of the outer side 76 of the passage wall 72 can have a generally smooth or rounded cross sectional shape and/or configuration, including, for example, a circular or oval shape or configuration, among other shapes. Moreover, according to certain embodiments, at least a portion of the portion of the outer side 76 of the passage wall 72 of the pass-through 46 may not include relatively sharp or square corners or transitions. Such a smooth or rounded cross sectional shape and/or configuration of at least a portion of the outer side 76 of the passage wall 72 of the pass-through 46 can assist in minimizing the pass-through 46 from hindering, or otherwise adversely impacting, the dielectric properties of any adjacent insulating medium 44 that is housed within the interior region 42 of the enclosure 32. The inner side 74 of the passage wall 72 of the pass-through 46, however, can have a cross sectional shape and configuration that may, or may not, be similar to that of the outer side 76 of the passage wall 72 of the pass-through 46, including, for example a rounded or non-round rounded cross sectional shape and/or configuration.

That pass-through 46 can be positioned at a variety of locations within the enclosure 32, and moreover relative to the interior region 42 of the enclosure 32. For example, as shown by FIG. 6, according to certain embodiments, the pass-through 46 can be positioned beneath the inner side 50 of the wall 48 of the enclosure 32. According to such embodiments, the pathway 78 of the pass-through 46 can be offset from the interior region 42 of the enclosure 32. Further, according to such embodiments, at least a portion of the outer side 76 of the passage wall 72 of the pass-through 46 can be formed, or otherwise provided, by at least a portion of the inner side 50 of an adjacent portion of the wall 48 of the enclosure 32 that generally defines a portion of the interior region 42 of the enclosure 32. Similarly, according to such embodiments, other portions of the passage wall 72 can be provided by the wall 48 of the enclosure 32. Thus, according to certain embodiments, the pathway 78, as well as the associated first and second open ends 64, 66, of the pass-through 46, can be formed during a casting of the enclosure 32 such that the pass-through 46 is a monolithic portion of the enclosure 32. According to such an embodiment, the pass-through 46 can be constructed from the same material as the enclosure 32.

According to other embodiments, the pass-through 46 can protrude, or otherwise be at least partially positioned within, the interior region 42 of the enclosure 32. Moreover, according to certain embodiments, at least a portion of the pass-through 46 can be positioned for direct contact of at least a portion of the outer side 76 of the passage wall 72 of the pass-through 46 with insulating medium 44 that is housed within the interior region 42 of the enclosure 32. Such embodiments can be configured to at least attempt to position the pass-through 46 at locations that can maximize the direct contact the pass-through 46 has with insulating medium 44 that is within the interior region 42 of the enclosure 32.

Figure 8:
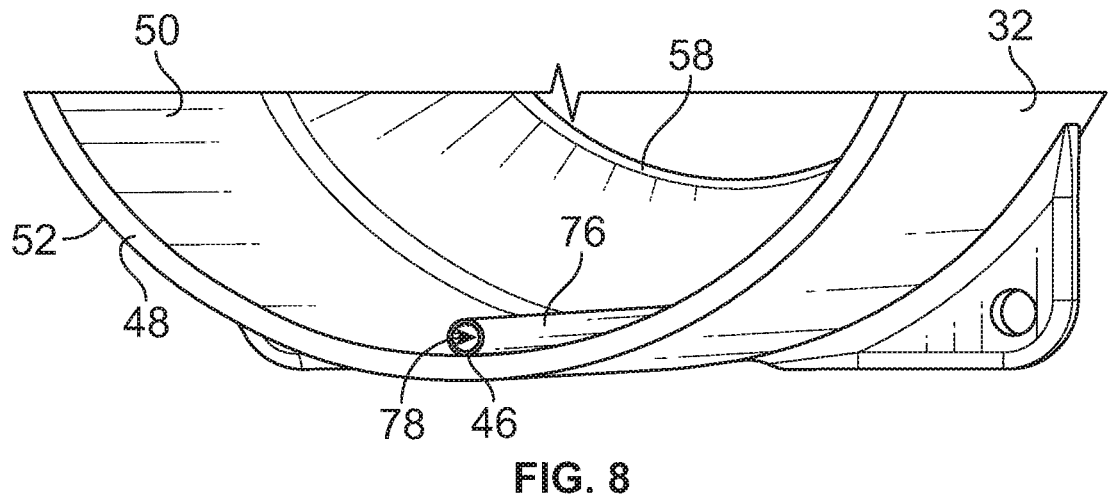
FIG. 8 illustrates a perspective end view of a portion of an integral pass-through that defines a portion of an interior area of an enclosure according to an illustrated embodiment of the subject application.

For example, FIGS. 5 and 8 embodiments in which the pass-through 46 extends into the interior region 42 of the enclosure 32, with a portion of the pass-through 46 being in abutment with at least a portion of the inner side 50 of the wall 48 of the enclosure 32. Further, FIG. 5 illustrates an example of embodiment in which at least a portion of the pass-through 46 46 that extends into the interior region 42 of the enclosure 32 can be integrated into the enclosure 32 via welding. Moreover, as shown in FIG. 5, according to certain embodiments, the wall 48 of the enclosure 32 can include at cavity 68 that linearly extends through the wall 48 generally at, or in proximity to, an end 60, of the enclosure 32. A similar cavity 68 can also be positioned in the wall 48 generally at, or in proximity to, an opposing end 58 of the enclosure 32. As shown, such cavities 68 can extend through the wall 48 and into the interior region 42 of the enclosure 32 so as to provide access for insertion of the pass-through 46 into, and through, the interior region 42. For example, according to certain embodiments, the pass-through 46 can comprise a tubular body 82, which can be constructed from materials similar or dissimilar to those of the wall 48 of the enclosure 32, which can extend between, and at least into a portion of, both of the opposing cavities 68. Thus, according to the illustrated embodiment, cavities 68 on opposing sides of the enclosure 32 can be generally aligned with each other, such as, for example, be positioned along, a central longitudinal axis that can be the same as the central longitudinal axis 70 of the pass-through 46. Further, according to certain embodiments, the portion of the wall 48 of the enclosure 32 that provides the cavities 68 can also be configured such that the cavities 68 also provide the counter bores 80 for the pathway 78 of the pass-through 46.

According to certain embodiments, the tubular body 82 of the pass-through 46 can be secured to the wall 48 of the enclosure 32 in the region of the cavities 68 in a manner that allows the tubular body 82 and enclosure 32 become a unitary, or integral, body. Moreover, the pass-through 46 can be secured to the enclosure 32 such that the pass-through 46 is generally permanently secured to the enclosure 32, and/or secured in a manner that does not generally accommodated selective removal and reattachment of the pass-through 46 from/to the enclosure 32. More specifically, according to certain embodiments, the pass-through 46 may become an integral portion of the enclosure 32 such that the pass-through 46 is not an auxiliary or separate component that is selectively added and/or removed from the enclosure 32 via use of mechanical fasteners, including for example bolts.

For example, according to the embodiment depicted in FIG. 5, a portion of the tubular body 82 of the pass-through 46 can be secured to the wall 48 of the enclosure 32 in the region of the both of the cavities 68 via one or more welds 84. Moreover, for example, according to the embodiment depicted in FIG. 5, a weld 84 can be positioned generally between each end of the tubular body 82 and a portion of the wall 48 of the enclosure 32 that is adjacent to, or generally defines, at least a portion of each of the cavities 68. Such welds 84, as well as the configurations and relative sizes of the tubular body 82 and cavities 68, can be configured to provide a seal that seeks to prevent leakage of insulating medium 44 from the interior region 42 of the enclosure 32.

Figure 9:
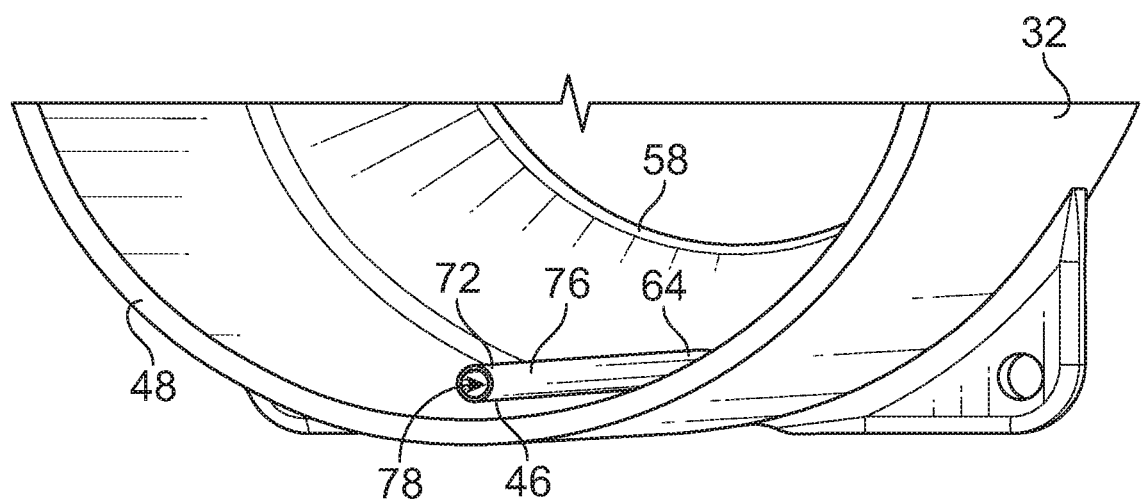
FIG. 9 illustrates a perspective end view of a portion of an integral pass-through that is offset from an interior area of an enclosure according to an illustrated embodiment of the subject application.

While FIG. 5 is discussed in terms of the use of a tubular body 82 that is welded to the enclosure 32, according to other embodiments, a pass-through 46 that extends into the interior region 42 can be formed in a variety of different manners, including, for example, during the casting of the enclosure 32, and or may be cast, or captured, into the casted enclosure 32. Additionally, while FIGS. 5 and 8 depict a pass-through 46 within the interior region 42 that abuts the inner side 50 of the wall 48, the pass-through 46 can be in a variety of other locations within the interior region 42 of the enclosure 32. For example, as indicated by FIG. 9, according to certain embodiments, the pass-through 46 can be positioned such that a portion of the pass-through 46 is suspended within at least a portion of the interior region 42. According to such an embodiment, portions of the passage wall 72 at or around both of the opposing open ends 64, 66 of the pass-through 46, and moreover, at opposing ends of the suspended portion of the pass-through 46, can be adjoined to, or part of, the wall 48 of the enclosure 32. For example, according to certain embodiments, both ends of the suspended portion of the pass-through 46 can part of, or otherwise welded to casted to, portions of the wall 48 of the enclosure 32 that are located at, or around, the first and second ends 58, 60 of the enclosure 32 such that the pass-through 46 is an integral portion of the enclosure 32.

Figure 10:
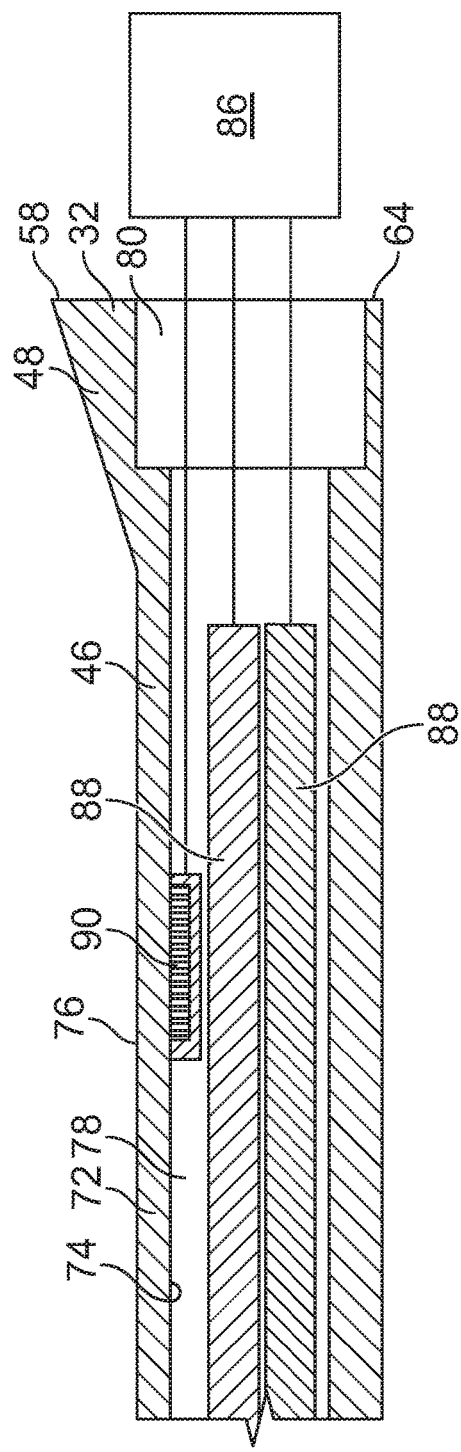
FIG. 10 illustrates a cross sectional view of an integral pass-through portion of an enclosure having a sensor and a plurality of temperature control elements positioned therein according to an illustrated embodiment of the subject application.
Figure 11:
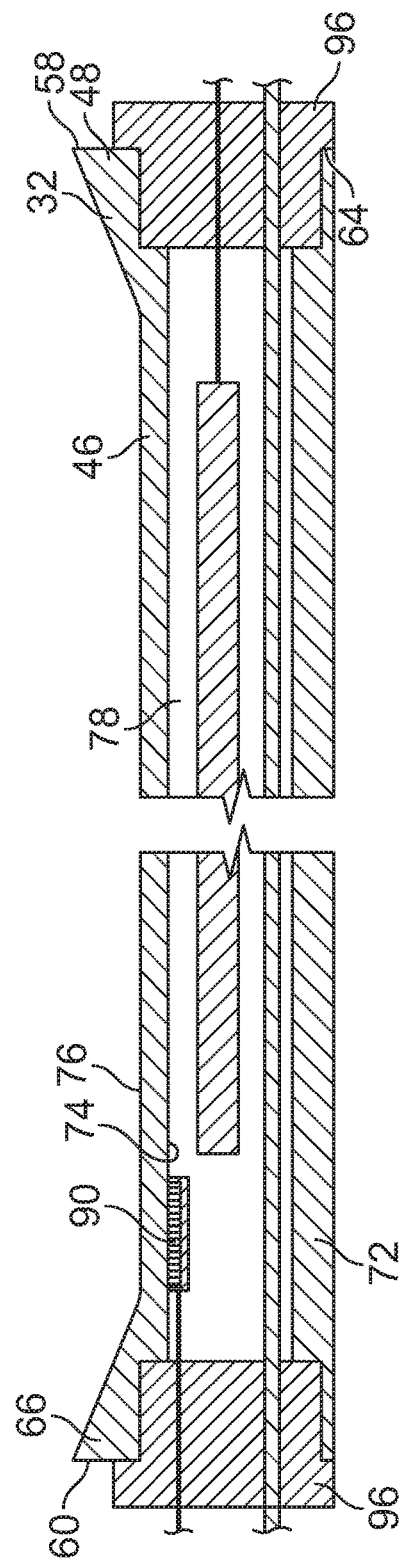

Referencing the integral pass-through 46 portions of the enclosures 32 shown in FIGS. 10 and 11, the pathway 78 in the pass-through 46 can be sized to house a variety of different components or devices that may, or may not, be associated with the operation of the circuit breaker 10. For example, according to certain embodiments, the pathway 78 is sized to house at least one temperature element 88, including, but not limited to, an electric heating element or rod, and/or a heat exchanger. Operation of such temperature elements 88 can be controlled in a variety of different manners, such as, for example, via a controller or thermostat 86, among other manners of control. The relative thinness of the passage wall 72 of the pass-through 46 can increase the efficiency at which the temperature element 88 can heat (or, alternatively, remove heat from) the insulating medium 44. Additionally, by integrating the pass-through 46 into the enclosure 32, heat provided by operation of the temperature element 88 can radiate to other portions of the wall 48 of the enclosure 32, and thus the thermal mass of the enclosure 32 can be used to increase the efficiency at which the insulating medium 44 can be heated, as well as reduce the rate at which the temperature of the heated insulating medium 44 cools after operation of the temperature element 88 is at least temporarily suspended. Additionally, access to the temperature element(s) 88 via either or both of the first and second open ends 64, 66 of the pass-through 46 can improve the ease with which the temperature element 88 can be assembled, accessed, and/or maintained within the pass-through 46.

Additionally, the pathway 78 in the pass-through 46 can also be sized to house one more sensors or probes 90, such as, for example, temperature probes and/or current sensors. According to the certain applications, one or more of the sensors 90 can be directly attached in the pathway 78 to the inner side 74 of the passage wall 72. The one or more sensors 90 can also be shielded from temperature element(s) 88 that may also be present in the pathway 78 in a variety of different manners, including, for example, via use of an insulation material 92 that is positioned about at least a portion of the temperature sensor(s) 90. Further, given the relatively thin thickness of the passage wall 72 separating the inner side 74 of the passage wall 72 from the insulating medium 44, the inner side 74 of the passage wall 72 of the pass-through 46 can be at, or around, the same temperature of the insulating medium 44, thereby enhancing the ability of the sensor 90 to sense or measure the actual temperature of the insulating medium 44. Such relatively thin wall thickness can also, according to certain embodiments, accommodate placement of a sensor 90 in the pass-through 46 that can sense current, or current levels, in the interior region 42 of the enclosure 32.

According to certain embodiments in which the sensor 90 senses temperature, information obtained via the sensor 90 can be used in selectively triggering operation of the temperature element(s) 88. Further, as the pass-through 46 of the subject application has both a first open end 64 and a second open end 66 at opposing side of the pass-through 46, the sensor 90 and temperature element 88 can extend through the same, or a different, open end 64, 66 of the pass-through 46. Additionally, the pass-through 46 can also be sized to accommodate passage of other components through the pass-through 46 that may, or may not, be specifically related to the circuit breaker 10, including, for example, accommodate the routing of cables and/or wires of other devices and/or equipment through the pass-through 46, and moreover through both of the open ends 64, 66 of, and across, the pathway 78 of the pass-through 46.

According to certain embodiments, the pass-through 46 can also be configured to minimize the adverse impact exposure of the pass-through 46 to certain external factors can have on the insulating medium 44. Such attempts to minimize the potentially adverse impact from exposure to external factors, including, but not limited to, wind and/or precipitation, can include positioning selectively removable end caps 96 about the first and/or second open ends 64, 66 of the pass-through 46, as shown, for example, by FIG. 11. As indicated in FIG. 11, such end caps 96 can include one or more orifices that can accommodate passage of certain components through the end caps 96 and into/from the pathway 78 of the pass-through 46. Additionally, such orifices can include a sealing member, such as, for example, a sealant, sealing ring, or sealing membrane, that can be positioned at least about the inner boundaries of the orifice and the component that is passing through the orifice.

The end caps 96 can be selectively coupled to the pass-through 46 and/or enclosure 32 in a variety of different manners, including, but not limited to, via use of a mounting flange 98 and associated mounting holes 100 (FIG. 7) that are generally aligned with mounting holes in the end cap 96. According to certain embodiments, such mounting holes 100 in the pass-through 46 and/or enclosure 32 can be configured to threadingly engage a mechanical fastener, such as, for example, a bolt, that can extend through a corresponding mounting hole in the end cap 96. Alternatively, the end cap 96 can be threadingly engaged, or engaged via press fit, among other manners of secure engagement, with the open ends 64, 66, including the counter bore 80, in the pass-through 46, as indicated in FIG. 11.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An enclosure for a circuit breaker, the enclosure comprising:
a first end and a second end, the first end and the second end being at opposing ends of the enclosure;
a wall that defines at least a portion of an interior region of the enclosure, the interior region sized to house a dielectric insulating medium and a circuit interrupter; and
a pass-through extending through at least a portion of the wall, the pass-through having a pathway that includes a first open end and a second open end, the first open end being adjacent to the first end of the enclosure, the second open end being adjacent to the second end of the enclosure, the first and second open ends being in fluid communication with each other across the pathway, wherein the pathway is not in direct fluid communication with the interior region.

2. The enclosure of claim 1, wherein the wall further defines a pair of openings, the pair of openings each sized and positioned to receive portion of an electrical conductor of a pole assembly.

3. The enclosure of claim 2, wherein an inner side of the wall defines at least a portion of the interior region, and wherein at least a portion of the pass-through extends through the enclosure beneath the inner side of the wall.

4. The enclosure of claim 2, wherein an inner side of the wall defines at least a portion of the interior region, and wherein at least a portion of the pass-through sits within the interior region along a portion of the inner side of the wall.

5. The enclosure of claim 2, wherein opposing ends of the pass-through are coupled to the enclosure at locations about the wall of the enclosure such that a portion of the pass-through therebetween is suspended within the interior region.

6. The enclosure of claim 1, further including a first end cap and a second end cap, the first end cap sized for selective coupling to the first open end, the second end cap sized for selective coupling to the second open end.

7. The enclosure of claim 1, wherein the enclosure extends between the first end and the second end along a first central longitudinal axis, and wherein the pass-through extends along a second central longitudinal axis, the first central longitudinal axis being parallel to, and offset from, the second central longitudinal axis.

8. The enclosure of claim 1, wherein an inner side of the wall defines at least a portion of the interior region, and wherein a portion of an outer side of the pass-through provides a portion of the inner side of the wall of the enclosure.

9. The enclosure of claim 1, wherein the pass-through comprises a tubular body that is coupled to the enclosure, the tubular body extending between a first cavity and a second cavity in the wall of the enclosure, the first cavity being adjacent to the first end of the enclosure, the second cavity being adjacent to the second end of the enclosure.

10. An apparatus comprising:
an enclosure extending between a first end and a second end along a first central longitudinal axis, the enclosure having an interior region and a pair of openings, each of the pair of openings sized to receive an electrical conductor of a pole assembly;
at least one end cap, the at least one end cap coupled to at least one of the first end or the second end of the enclosure; and
a pass-through having a pathway, the pathway having a first open end and a second open end, the first and second open ends being in direct fluid communication through the pathway, the first and second open ends secured to the enclosure such that the pass-through is integral to the enclosure, the pathway not being in direct fluid communication with the interior region.

11. The apparatus of claim 10, wherein at least a portion of the pass-through extends through the enclosure beneath the interior region of the enclosure.

12. The apparatus of claim 10, wherein at least a portion of the pass-through extends through the interior region of the enclosure.

13. The apparatus of claim 10, wherein opposing ends of the pass-through are coupled to the enclosure such that a portion of the pass-through therebetween is suspended within the interior region.

14. The apparatus of claim 10, further including a first end cap and a second end cap, the first end cap sized for selective coupling to the first open end, the second end cap sized for selective coupling to the second open end.

15. The apparatus of claim 10, wherein the enclosure extends between the first end and the second end along a first central longitudinal axis, and wherein the pass-through extends along a second central longitudinal axis, the first central longitudinal axis being parallel to, and offset from, the second central longitudinal axis.

16. The apparatus of claim 10, wherein a portion of an outer side of a pathway wall of the pass-through defines a portion of the interior region of the enclosure.

17. The apparatus of claim 10, wherein the pass-through comprises a tubular body that is coupled to the enclosure, the tubular body extending between a first cavity and a second cavity in a wall of the enclosure, the first cavity being adjacent to a first end of the enclosure, the second cavity being adjacent to a second end of the enclosure, and wherein a portion of the tubular body is positioned within the interior region of the enclosure.

18. A circuit breaker comprising:
at least one pole assembly having a first electrical conductor, a second electrical conductor, an enclosure, and a circuit interrupter,
wherein the enclosure includes an interior region and a pass-through, the interior region sized to house the circuit interrupter and a dielectric insulating medium, the pass-through having a pathway having a first open end and a second open end, the first and second open ends being in direct fluid communication through the pathway, the first and second open ends secured to the enclosure such that the pass-through is integral to the enclosure, and wherein the pathway is not in direct fluid communication with the interior region.

19. The circuit breaker of claim 18, wherein at least a portion of the pass-through extends through the enclosure beneath the interior region of the enclosure.

20. The circuit breaker of claim 18, wherein at least a portion of the pass-through extends through the interior region of the enclosure.

* * * * *